INVENTOR.
PAUL S. BENDEL
BY W. B. Harpman
ATTORNEY

United States Patent Office 3,110,295
Patented Nov. 12, 1963

1

3,110,295
AIR INJECTING DEVICE FOR INTERNAL
COMBUSTION ENGINES
Paul S. Bendel, 1436 Western Reserve Road, R.D.,
Poland, Ohio
Filed Aug. 31, 1962, Ser. No. 220,792
7 Claims. (Cl. 123—119)

This invention relates to internal combustion engines and more particularly to an air injecting device arranged to admit air to the intake manifold of an internal combustion engine in an controlled manner relative to the operation of the carburetor and the manifold pressure of said engine so as to increase the efficiency of the internal combustion engine by improving the combustion of the fuel utilized therein and acting to obtain more miles per gallon from a given fuel and to permit the use of various other fuels in internal combustion engines originally intended to burn gasoline.

The principal object of the invention is the provision of a device for introducing air in controlled amounts into an intake manifold of an internal combustion engine.

A further object of the invention is the provision of a device for introducing air into the intake manifold of an internal combustion engine and which device is responsive in operation to the positions of the operating portions of the carburetor and to the manifold pressure in said intake manifold.

A still further object of the invention is the provision of a simple and efficient device for improving the miles per gallon ratio of fuel used in an internal combustion engine in a motor vehicle by increasing the oxidizing efficiency of the fuel introduced thereinto.

A still further object of the invention is the provision of a device for controlling the introduction of additional air into the fuel and air mixture delivered into the intake manifold of an internal combustion engine from a carburetor and wherein such device is responsive in operation to the manifold pressure.

A still further object of the invention is the provision of a device for controlling the introduction of additional air into the fuel and air mixture delivered into the intake manifold of an internal combustion engine from a carburetor and wherein such device is responsive in operation to the position of the accelerator control valve of said carburetor.

The device for introducing air into the intake manifold of an internal combustion engine as disclosed herein comprises a fuel saving attachment operating on the principle of improved oxidization of the fuel-air mixture delivered by the carburetor of such an engine to the intake manifold thereof and whereby the air content of the fuel-air mixture may be increased and at the same time controlled so that an improved performance results with a greater miles per gallon of fuel being obtained and a marked efficiency in the burning of the fuel through the improved oxidation to the extent that fuels other than gasoline may be used in internal combustion engines designed for using gasoline and particularly kerosene may be substituted and the engine operated efficiently therewith in connection with the air introducing device disclosed herein.

With the foregoing and other objects in view which will appear as the description proceeds, the invention resides in the combination and arrangement of parts and in

2 the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
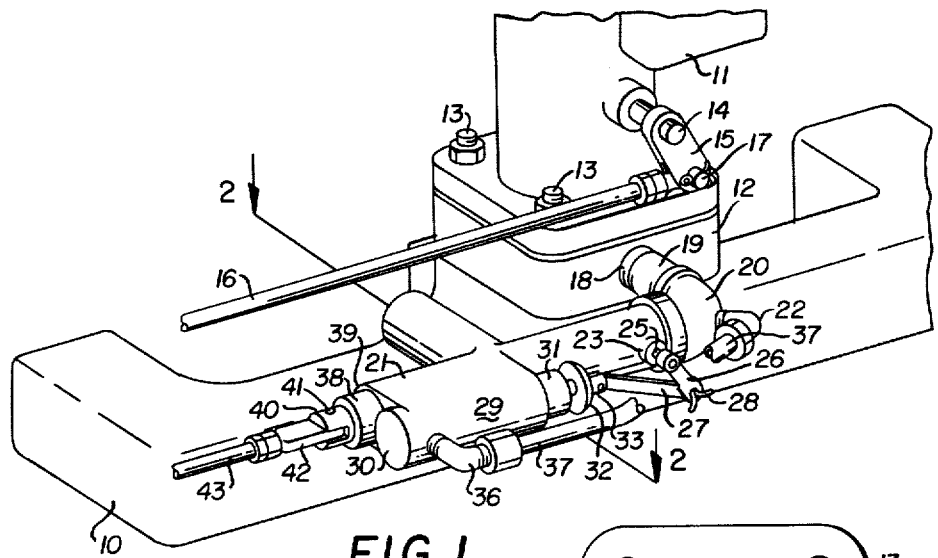
FIGURE 1 is a perspective view of a portion of an intake manifold of an internal combustion engine and a portion of a carburetor mounted thereon by way of an adapter plate incorporating an air introducing opening.

By referring to the drawings and FIGURE 1 in particular, it will be seen that an intake manifold 10 of an internal combustion engine such as commonly used in motor vehicles is disclosed together with a portion of a carburetor 11 which may be a conventional carburetor as used on the usual internal combustion engine in a motor vehicle and that an adapter plate 12 has been positioned between the base of the carburetor 11 and the upper surface of the intake manifold 10 which normally communicates directly with the carburetor 11. The adapter plate 12 permits the carburetor to be bolted to the intake manifold in the usual manner by the simple expedient of using longer bolts 13, 13. The accelerator pedal control valve in the carburetor 11 is illustrated by its shaft extension 14 to which an arm 15 is attached with the arm 15 being pivotally engaged on the end of an operating rod 16 which leads to an accelerator pedal in the motor vehicle by the usual accelerator pedal-carburetor linkage as will be understood by those skilled in the art. The pivot utilized herein for establishing the connection between the rod 16 and the arm 15 comprises a pivot pin 17.

Figure 2:
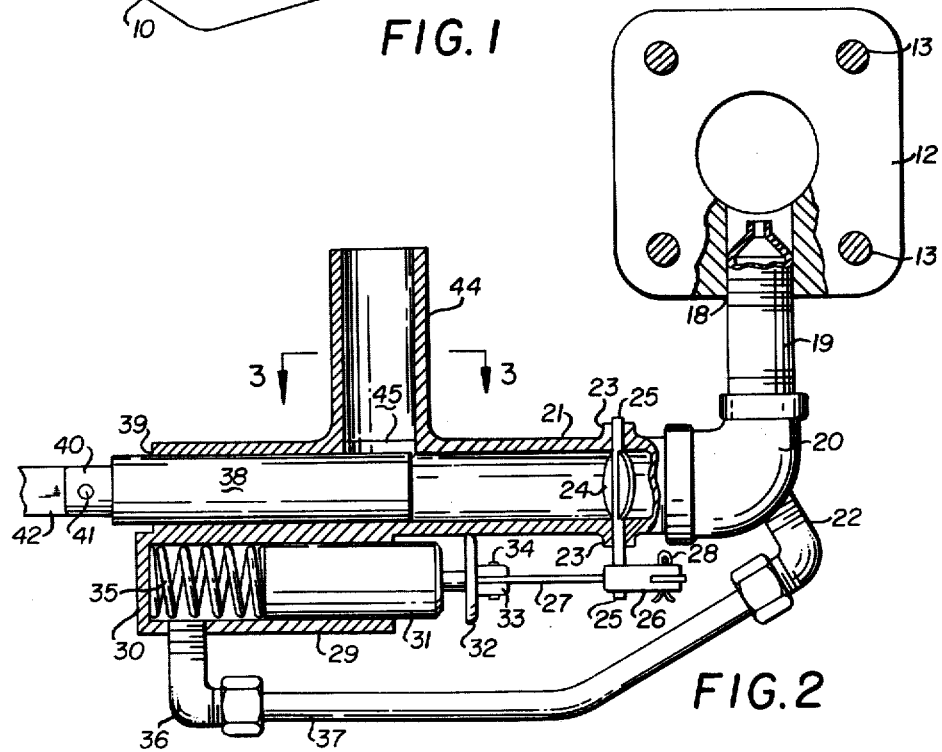
FIGURE 2 is a horizontal section on line 2—2 of FIGURE 1.

The adapter plate 12 has a sidewardly extending opening 18 therein in which a jet-like nozzle is incorporated and the opening 18 is threaded to receive a tubular member 19 which in turn engages an L 20. By referring now to FIGURE 2 of the drawings a portion of the adapter plate 12 will be seen to be broken away to expose and disclose the jet-like nozzle heretofore referred to as directed into the vertical passageway through the adapter plate 12 which establishes communication between the carburetor 11 and the intake manifold 10 as heretofore referred. The L 20 has an elongated cylindrical member 21 secured thereto as by threadably engaging the same and the L 20 has a threaded opening therein in which a secondary L 22 is positioned to establish communication therewith. The elongated cylindrical member 21 has oppositely disposed apertured bosses 23, 23 thereon and a butterfly valve 24 is positioned on a shaft 25 journalled in said apertured bosses 23, 23 with one end of the shaft 25 extending outwardly and secured to an arm 26 which in turn is pivotally attached to a link 27 by means of a removable cotter pin 28. The elongated cylindrical member 21 has a secondary cylindrical body 29 preferably formed integrally therewith and arranged with one end 30 thereof being closed and the other end being open and reciprocably receiving a piston 31 having an enlarged collar 32 adjacent the outermost end thereof and a bifurcated extension 33 to which the link 27 is pivotally secured by a pin 34. A coil spring 35 is caged between the closed end 30 of the secondary cylindrical body 29 and the piston 31 and normally urges the piston 31 to the right as seen in FIGURE 2. A third L 36 communicates with the secondary cylindrical body 29 adjacent the closed end 30 thereof and a tube 37 establishes communication between the third L 36 and the secondary L 22 heretofore referred to. It will thus be seen that manifold pressure or vacuum, as the term is generally understood, existing in the manifold 10 and in the central aperture of the adapter plate 12 is in direct communication by way of the pipe 19 and L 20, secondary L 22, tube 37 and third L 26 with the area between the piston 31 and the closed end 30 of the secondary cylindrical body member 29 and that therefore the position of the piston 31 is directly controlled thereby and that said position directly controls the position of the butterfly valve 24.

By referring again to the elongated cylindrical body member 21 and it will be observed that a slide valve 38 is mounted therein and extends out of an open end 39 thereof and is bifurcated as at 40 and provided with a pivot pin 41 by which it is attached to a link 42 which in turn is attached to a rod 43 which is directly connected to the accelerator pedal linkage and movable simultaneously with the rod 16 thereof heretofore referred to.

Figure 3:
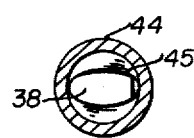
FIGURE 3 is a vertical section on line 3—3 of FIGURE 2.

By referring to FIGURES 2 and 3 of the drawings, it will be seen that the elongated cylindrical body member 21 has a sidewardly projecting tubular extension 44 with a communicating orifice 45 in the inner end thereof establishing communication with the approximate middle portion of the elongated cylindrical body member 21 and that area thereof controlled by the slide valve 38. As illustrated in FIGURE 2 of the drawing, the internal combustion engine is idling, the accelerator pedal is in idle position with the carburetor valve on the shaft 14 in comparable position and the slide valve 38 is practically closing the aperture 45 so that little or no air is being introduced by the device. At the same time, the butterfly valve 24 is in substantially closed position by reason of the relatively low manifold pressure or vacuum existing in the intake manifold as heretofore explained.

Those skilled in the art will understand that when the accelerator pedal is depressed the rod 16 will move to the left as seen in FIGURE 1 and open the main valve in the carburetor 11 and permit a larger quantity of air and fuel mixture to be introduced into the intake manifold. Simultaneously with such operation, the internal combustion engine will speed up and the manifold pressure will change, the relative vacuum or minus atmospheric pressure increasing. Simultaneously, the slide valve 38 will open and admit air from the pipe 44 to the cylindrical body member 21 where it will be passed by the butterfly valve 24 which is also opened responsive to the change in manifold pressure which has caused the piston 31 to move to the left and compress the spring 35 and this additional air introduced into the air-fuel mixture will improve the oxidation of the fuel and result in increased gasoline mileage or permit the use of alternate fuels, such as kerosene, with equally increased combustion efficiency.

At such times as the directly coupled and operated slide valve 38 admits too much air and affects the manifold pressure adversely, the relative change will be reflected by the piston 31 and the partial or complete closing of the butterfly valve 24 thereby automatically maintaining the most efficient air injection rate relative to the operation of the internal combustion engine. Those skilled in the art will understand that adjustments are made when the device is installed on an engine so that the internal combustion engine will operate at peak efficiency at all times and that these adjustments may comprise the alteration of the size or shape of the nozzle through which the extra air is introduced, the positioning of the butterfly valve 24 and/or the slide valve 38 relative to the orifice 45 all of which are of minor degree and relatively easy to achieve.

It will thus be seen that a device for introducing air into the intake manifold of an internal combustion engine has been disclosed which has the unique capability of responding directly with the action of the carburetor and incorporating a manifold pressure or vacuum responsive portion which over-controls or overrides the mechanically responsive portions of the device thereby maintaining the same at its maximum efficiency and permitting unusual fuel efficiency in the operation of the internal combustion engine on which the device is used. It will be understood that the illustrated embodiment is illustrative only and that the adapter plate 12 can obviously take any shape or size necessary to establish communication between any particular carburetor and any particular intake manifold.

It will also be understood by those skilled in the art that if desired a small blower may be connected to the pipe 44 so that air under pressure is controlled by the slide valve 38 or that alternately it may be connected to a secondary air cleaner or the principal air cleaner as desired.

It will thus be seen that a device for introducing auxiliary air into the intake manifold of an internal combustion engine to increase the efficiency of the operation thereof and to effect the relative fuel savings during said operation has been disclosed and having thus described my invention, what I claim is:

1. A device for admitting controlled amounts of air into the manifold of an internal combustion engine having a carburetor thereon and accelerator pedal linkage controlling said carburetor, said device comprising an elongated cylindrical member having a valve member reciprocably mounted therein, said valve member having means interconnecting the same with said carburetor-accelerator pedal linkage for actuation simultaneously therewith and controlling an air admitting aperture in said elongated cylindrical member, said elongated cylindrical member being in communication with said intake manifold by way of an adapter plate installed between said intake manifold and said carburetor and establishing communication therebetween and with said elongated cylindrical member, a butterfly valve in one of said elongated cylindrical member, a closed end cylinder mounted on said elongated cylindrical member and means establishing communication between said adapter plate and said closed end cylinder, a piston in said closed end cylinder, linkage connecting said piston with said butterfly valve for moving the same responsive to movement of said piston, means in said closed end cylinder normally urging said piston outwardly of said closed end cylinder, said piston being movable into said closed end cylinder responsive to a change in the manifold pressure in said intake manifold.

2. The device for admitting controlled amounts of air into the manifold of an internal combustion engine as set forth in claim 1 and wherein said means in said closed end cylinder normally urging said piston outwardly thereof comprises a spring.

3. The device for admitting controlled amounts of air into the manifold of an internal combustion engine as set forth in claim 1 and wherein said adapter plate comprises a centrally apertured body member having a transversely extending opening in communication with said elongated cylindrical member.

4. The device for admitting controlled amounts of air into the manifold of an internal combustion engine set forth in claim 1 and wherein said piston in said closed end cylinder has a collar adjustably positioned on the outermost end thereof acting to limit the positioning of said piston in said closed end cylinder.

5. The device for admitting controlled amounts of air into the manifold of an internal combustion engine as set forth in claim 1 and wherein said elongated cylindrical member has said air admitting aperture located substantially midway between its ends and wherein said air admitting aperture is of oval configuration.

6. The device for admitting controlled amounts of air into the manifold of an internal combustion engine as set forth in claim 1 and wherein said butterfly valve is located in the end of said elongated cylindrical member in communication with said adapter plate.

7. The device for admitting controlled amounts of air into the manifold of an internal combustion engine as set forth in claim 1 and wherein the adapter plate has a jet formation in the passageway establishing communication with said elongated cylindrical member.

References Cited in the file of this patent

UNITED STATES PATENTS

| | | |
|---|---|---|
| 1,737,196 | Mortenson et al. | Nov. 26, 1929 |
| 1,916,257 | Dubina | July 4, 1933 |

UNITED STATES PATENT OFFICE
CERTIFICATE OF CORRECTION

Patent No. 3,110,295                 November 12, 1963

Paul S. Bendel

It is hereby certified that error appears in the above numbered patent requiring correction and that the said Letters Patent should read as corrected below.

Column 4, line 39, after "one" insert -- end --.

Signed and sealed this 16th day of June 1964.

(SEAL)
Attest:

ERNEST W. SWIDER
Attesting Officer

EDWARD J. BRENNER
Commissioner of Patents